United States Patent
Helou, Jr. et al.

(10) Patent No.: US 8,268,417 B2
(45) Date of Patent: Sep. 18, 2012

(54) MULTI-LAYER CONTAINER

(75) Inventors: Elie Helou, Jr., Santa Barbara, CA (US); David A. Dellinger, Santa Barbara, CA (US); William V. Hickey, Franklin Lakes, NJ (US); Neil J. Dunn, Shrewsbury (GB); Dwight W. Schwark, Simpsonville, SC (US); Drew V. Speer, Simpsonville, SC (US)

(73) Assignee: Biosphere Industries, LLC, Carpinteria, CA (US)

( * ) Notice: Subject to any disclaimer, the term of this patent is extended or adjusted under 35 U.S.C. 154(b) by 99 days.

(21) Appl. No.: 12/690,833

(22) Filed: Jan. 20, 2010

(65) Prior Publication Data

US 2010/0237069 A1 Sep. 23, 2010

Related U.S. Application Data

(60) Provisional application No. 61/145,940, filed on Jan. 20, 2009, provisional application No. 61/146,239, filed on Jan. 21, 2009, provisional application No. 61/167,090, filed on Apr. 6, 2009.

(51) Int. Cl.
*B29D 22/00* (2006.01)

(52) U.S. Cl. .............. 428/34.2; 220/495.01; 206/524.3; 428/34.6; 428/35.6; 428/35.9

(58) Field of Classification Search ................ 428/34.1, 428/34.2, 34.6, 35.6, 35.9, 36.91; 206/524.1, 206/524.2, 524.3, 524.6; 426/127, 125, 126, 426/129, 138, 139; 220/200, 495.1, 62.11
See application file for complete search history.

(56) References Cited

U.S. PATENT DOCUMENTS

| | | | | |
|---|---|---|---|---|
| 2,600,560 A | * | 6/1952 | McMahon | 363/172 |
| 3,468,468 A | * | 9/1969 | Foote | 229/407 |
| 3,587,794 A | | 6/1971 | Mattel | |
| 3,648,882 A | * | 3/1972 | Shelton | 220/495.01 |
| 3,772,076 A | | 11/1973 | Keim | |
| 3,829,918 A | | 8/1974 | Stamberger | |
| 3,972,467 A | * | 8/1976 | Whillock et al. | 428/213 |
| 4,097,297 A | | 6/1978 | Keene | |
| 4,694,638 A | | 9/1987 | Maddux, Jr. | |
| 5,025,004 A | | 6/1991 | Wu et al. | |
| 5,035,981 A | | 7/1991 | Kurtz et al. | |

(Continued)

FOREIGN PATENT DOCUMENTS

CA 2317023 A1 5/2001

(Continued)

OTHER PUBLICATIONS

Ducey et al, "Alkaline sizing applications surge ahead," Alkaline Paper Advocate, Oct. 1, 1996.

(Continued)

*Primary Examiner* — N. Edwards
(74) *Attorney, Agent, or Firm* — Perkins Coie LLP; Joseph P. Hamilton

(57) ABSTRACT

One embodiment of the present invention provides a partly-biodegradable system, which comprises a non-biodegradable portion and a biodegradable portion wherein the non-biodegradable portion is easily separated from the biodegradable portion for disposal of the system. In certain embodiments, the system further comprises a cover layer of non-biodegradable film which adheres to the first non-biodegradable portion to form a sealed compartment for food or drink reservation.

20 Claims, 2 Drawing Sheets

U.S. PATENT DOCUMENTS

| | | | |
|---|---|---|---|
| 5,100,586 A | 3/1992 | Jennings et al. |
| 5,169,566 A | 12/1992 | Stucky et al. |
| 5,205,863 A | 4/1993 | Elion |
| 5,232,496 A | 8/1993 | Jennings et al. |
| 5,272,856 A | 12/1993 | Pharo |
| 5,345,069 A | 9/1994 | Grindrod |
| 5,352,111 A | 10/1994 | Selbak |
| 5,354,621 A | 10/1994 | Liebermann |
| 5,356,579 A | 10/1994 | Jennings et al. |
| 5,358,676 A | 10/1994 | Jennings et al. |
| 5,376,320 A | 12/1994 | Tiefenbacher et al. |
| 5,385,764 A | 1/1995 | Andersen et al. |
| 5,412,005 A | 5/1995 | Bastioli |
| 5,453,310 A | 9/1995 | Andersen et al. |
| 5,506,046 A | 4/1996 | Andersen et al. |
| 5,508,072 A | 4/1996 | Andersen et al. |
| 5,514,430 A | 5/1996 | Andersen et al. |
| 5,523,293 A | 6/1996 | Jane |
| 5,527,387 A | 6/1996 | Andersen et al. |
| 5,543,186 A | 8/1996 | Andersen et al. |
| 5,545,297 A | 8/1996 | Andersen et al. |
| 5,545,450 A | 8/1996 | Andersen et al. |
| 5,549,859 A | 8/1996 | Andersen et al. |
| 5,576,049 A | 11/1996 | Haas |
| 5,580,409 A | 12/1996 | Andersen et al. |
| 5,580,624 A | 12/1996 | Andersen et al. |
| 5,582,670 A | 12/1996 | Andersen et al. |
| 5,614,307 A | 3/1997 | Andersen et al. |
| 5,618,341 A | 4/1997 | Anderson et al. |
| 5,626,954 A | 5/1997 | Andersen et al. |
| 5,631,052 A | 5/1997 | Andersen et al. |
| 5,631,053 A | 5/1997 | Andersen et al. |
| 5,631,097 A | 5/1997 | Andersen et al. |
| 5,635,292 A | 6/1997 | Jennings et al. |
| 5,637,412 A | 6/1997 | Jennings et al. |
| 5,641,584 A | 6/1997 | Andersen et al. |
| 5,654,048 A | 8/1997 | Andersen et al. |
| 5,658,603 A | 8/1997 | Andersen et al. |
| 5,658,624 A | 8/1997 | Anderson et al. |
| 5,660,900 A | 8/1997 | Andersen et al. |
| 5,660,903 A | 8/1997 | Andersen et al. |
| 5,660,904 A | 8/1997 | Andersen et al. |
| 5,662,731 A | 9/1997 | Anderson et al. |
| 5,665,152 A | 9/1997 | Bassi et al. |
| 5,665,439 A | 9/1997 | Andersen et al. |
| 5,665,442 A | 9/1997 | Andersen et al. |
| 5,676,905 A | 10/1997 | Andersen et al. |
| 5,679,145 A | 10/1997 | Anderson et al. |
| 5,679,381 A | 10/1997 | Andersen et al. |
| 5,683,772 A | 11/1997 | Andersen et al. |
| 5,691,014 A | 11/1997 | Andersen et al. |
| 5,693,355 A | 12/1997 | Haas |
| 5,695,811 A | 12/1997 | Andersen et al. |
| 5,702,787 A | 12/1997 | Andersen et al. |
| 5,705,203 A | 1/1998 | Andersen et al. |
| 5,705,237 A | 1/1998 | Andersen et al. |
| 5,705,238 A | 1/1998 | Andersen et al. |
| 5,705,239 A | 1/1998 | Andersen et al. |
| 5,705,242 A | 1/1998 | Andersen et al. |
| 5,707,474 A | 1/1998 | Andersen et al. |
| 5,709,827 A | 1/1998 | Andersen et al. |
| 5,709,913 A | 1/1998 | Andersen et al. |
| 5,711,908 A | 1/1998 | Tiefenbacher et al. |
| 5,714,217 A | 2/1998 | Andersen et al. |
| 5,716,675 A | 2/1998 | Andersen et al. |
| 5,720,913 A | 2/1998 | Andersen et al. |
| 5,736,209 A | 4/1998 | Andersen et al. |
| 5,738,921 A | 4/1998 | Andersen et al. |
| 5,753,308 A | 5/1998 | Andersen et al. |
| 5,766,525 A | 6/1998 | Andersen et al. |
| 5,776,388 A | 7/1998 | Andersen et al. |
| 5,783,126 A | 7/1998 | Andersen et al. |
| 5,786,080 A | 7/1998 | Andersen et al. |
| 5,798,151 A | 8/1998 | Andersen et al. |
| 5,800,647 A | 9/1998 | Andersen et al. |
| 5,800,756 A | 9/1998 | Andersen et al. |
| 5,810,961 A | 9/1998 | Andersen et al. |
| 5,830,305 A | 11/1998 | Andersen et al. |
| 5,830,548 A | 11/1998 | Andersen et al. |
| 5,843,501 A * | 12/1998 | Rubin et al. ............... 426/127 |
| 5,843,544 A | 12/1998 | Andersen et al. |
| 5,851,634 A | 12/1998 | Andersen et al. |
| 5,868,824 A | 2/1999 | Andersen et al. |
| 5,922,379 A | 7/1999 | Wang |
| 5,928,741 A | 7/1999 | Andersen et al. |
| 5,973,082 A | 10/1999 | Elmore |
| 5,976,235 A | 11/1999 | Andersen et al. |
| 6,030,673 A | 2/2000 | Andersen et al. |
| 6,032,800 A * | 3/2000 | Kocher .................. 206/459.5 |
| 6,083,586 A * | 7/2000 | Andersen et al. .......... 428/36.4 |
| 6,090,195 A | 7/2000 | Andersen et al. |
| 6,146,573 A | 11/2000 | Shogren et al. |
| 6,168,857 B1 | 1/2001 | Andersen et al. |
| 6,180,037 B1 | 1/2001 | Andersen et al. |
| 6,194,040 B1 * | 2/2001 | Delius et al. ............ 428/34.8 |
| 6,200,404 B1 | 3/2001 | Andersen et al. |
| 6,221,411 B1 * | 4/2001 | Sanfilippo et al. ............ 426/129 |
| 6,228,898 B1 | 5/2001 | Nakanishi |
| 6,231,970 B1 | 5/2001 | Andersen et al. |
| 6,277,899 B1 | 8/2001 | Bastioli |
| 6,337,097 B1 | 1/2002 | Sun |
| 6,347,934 B1 | 2/2002 | Andersen et al. |
| 6,379,446 B1 | 4/2002 | Andersen et al. |
| 6,423,357 B1 * | 7/2002 | Woods et al. .............. 426/138 |
| 6,447,826 B1 * | 9/2002 | Matthews .................. 426/126 |
| 6,494,704 B1 | 12/2002 | Andersen et al. |
| 6,585,859 B1 | 7/2003 | Hakansson |
| 6,589,327 B1 | 7/2003 | Snidow |
| 6,602,590 B2 * | 8/2003 | Ting et al. .................. 428/218 |
| 6,667,067 B1 * | 12/2003 | Noel et al. .................... 426/127 |
| 6,755,008 B2 | 6/2004 | Schmetzer et al. |
| 6,846,573 B2 | 1/2005 | Seydel |
| 6,878,199 B2 | 4/2005 | Bowden et al. |
| 6,893,672 B2 * | 5/2005 | Ingraham .................. 426/107 |
| 7,083,673 B2 | 8/2006 | Bowden et al. |
| 7,141,256 B2 * | 11/2006 | Noel et al. .................... 426/127 |
| 7,196,124 B2 | 3/2007 | Parker et al. |
| 7,553,363 B2 * | 6/2009 | Dellinger et al. ......... 106/162.51 |
| 7,776,416 B2 * | 8/2010 | Kinard et al. ............. 428/36.1 |
| 2003/0047110 A1 | 3/2003 | Poovarodom et al. |
| 2003/0143417 A1 | 7/2003 | Kesselring et al. |
| 2003/0216492 A1 | 11/2003 | Bowden et al. |
| 2006/0075544 A1 | 4/2006 | Kriesel et al. |
| 2006/0110498 A1 | 5/2006 | Dellinger |
| 2006/0229207 A1 | 10/2006 | Mentink et al. |
| 2006/0255507 A1 | 11/2006 | Bowden et al. |
| 2007/0021534 A1 | 1/2007 | Glenn et al. |
| 2007/0234965 A1 | 10/2007 | Aguilar et al. |
| 2007/0243346 A1 | 10/2007 | Kim |
| 2007/0254970 A1 | 11/2007 | Kitamura |
| 2009/0008819 A1 | 1/2009 | Ozasa |
| 2010/0237069 A1 * | 9/2010 | Helou et al. ................. 220/200 |
| 2010/0311874 A1 | 12/2010 | Mentink et al. |

FOREIGN PATENT DOCUMENTS

| | | |
|---|---|---|
| CN | 201183645 Y | 1/2009 |
| GB | 1476764 | 6/1977 |
| GB | 2398055 A | 8/2004 |
| JP | 08-081565 | 3/1996 |
| JP | 10-245792 | 9/1998 |
| JP | 11-222794 | 8/1999 |
| WO | WO 97/23333 | 7/1997 |
| WO | WO 99/45073 A | 9/1999 |
| WO | WO 00/39213 | 6/2000 |
| WO | WO 00/39215 A | 7/2000 |
| WO | WO 2005/021633 | 10/2005 |
| WO | WO 2006/102710 A1 | 10/2006 |
| WO | WO 2007/111567 A1 | 10/2007 |
| WO | WO 2009/013489 A1 | 1/2009 |
| WO | WO 2009/014483 A1 | 1/2009 |

OTHER PUBLICATIONS

European Patent Office, EP Examination Report for EP04782322.4, Sep. 23, 2009.

European Patent Office, EP Supplemental Search Report for EP04782322.4, Jun. 10, 2009.

European Patent Office, EP Supplemental Search Report and Search Opinion for EP 06827369.7, Oct. 7, 2009.
European Patent Office, Extended European Search Report for EP 08842589, Sep. 27, 2011.
Hagenmaier et al., Wax microemulsions . . . , J. Agri Food Chem, 42, 899-902., 1994.
Japanese Patent Office, JP Office Action (English Translation) for JP 2006-524867, Dec. 8, 2009.
United States Patent and Trademark Office, International Search Report and Written Opinion for PCT/US04/27824, Aug. 29, 2008.
United States Patent and Trademark Office, International Search Report and Written Opinion for PCT/US06/42800, May 2, 2007.
United States Patent and Trademark Office, International Search Report and Written Opinion for PCT/US08/69266, Oct. 2, 2008.
United States Patent and Trademark Office, International Search Report and Written Opinion for PCT/US08/80979, Dec. 24, 2008.
United States Patent and Trademark Office, International Search Report and Written Opinion for PCT/US10/21537, Mar. 2, 2010.
United States Patent and Trademark Office, International Search Report and Written Opinion for PCT/US10/21668, Mar. 9, 2010.
United States Patent and Trademark Office, International Search Report and Written Opinion for PCT/US10/30124, USPTO, Jun. 4, 2010.
United States Patent and Trademark Office, International Search Report and Written Opinion for PCT/US10/37446, USPTO, Aug. 13, 2010.

* cited by examiner

MULTI-LAYER CONTAINER

CROSS REFERENCE TO RELATED APPLICATIONS

This application claims the benefit of U.S. Provisional Patent Application No. 61/145,940, filed Jan. 20, 2009; U.S. Provisional Patent Application No. 61/146,239, filed Jan. 21, 2009; and U.S. Provisional Patent Application No. 61/167,090, filed Apr. 6, 2009, all of which are incorporated herein by reference in their entirety.

BACKGROUND

One method currently used to address environmental concerns for conventional disposable food container products is the manufacture of starch-based disposable food service items such as trays, plates, and bowls. Because starch-based biodegradable food service items are formed in heated molds, much or all of the starch in these items is cooked, and cooked starch is sensitive to moisture. When exposed to water, other aqueous fluids, or significant amounts of water vapor, these items may become very soft, losing form-stability and becoming susceptible to puncture. The moisture sensitivity of these items can be a drawback in some applications, particularly more demanding, high moisture applications such as ready to eat meals, bakery items, frozen ready meals, chilled food, soup and noodle bowls, cups for coffee, hot chocolate, and other beverages, cereal bowls, ice cream and yogurt cups, and other similar high-moisture applications. On the other hand, such starch based products are desirable in that they can withstand higher temperatures, which makes them desirable as containers for many of the aforementioned applications, and they are readily compostable.

Another property that may be desirable for certain packaging applications using starch-based items is good impermeability to oxygen or other gases. However, starch items are often permeable to oxygen and other gases, such that some modification of the starch composition and/or the item itself would be required to provide improved barrier properties.

Non-biodegradable and biodegradable films having acceptable moisture and oxygen resistance are known in the art. However, when laminated to biodegradable cardboard, paper or plastic materials to make them functional, these films adhere to the cardboard, paper or plastic substrates such that the biodegradable and non-biodegradable portions cannot be easily separated, effectively eliminating the environmental advantages of the biodegradable portion.

Accordingly, there is a need in the art for improved containers with increased moisture resistance, oxygen barrier or other gas barrier, with biodegradable and environmentally friendly properties that allow easy disposal of the various parts.

SUMMARY

One embodiment of the present invention provides a partly-biodegradable system, which comprises a non-biodegradable film portion and a biodegradable structural portion wherein the non-biodegradable portion is easily separated from the biodegradable portion for disposal of the system. In certain embodiments, the system further comprises a cover layer of non-biodegradable film which adheres to the first non-degradable film portion to form a sealed compartment for food or drink reservation.

Another embodiment of the present invention provides a method to create a partly-biodegradable system, which comprises a non-biodegradable film portion and a biodegradable portion and wherein the non-biodegradable film portion is easily separated from the biodegradable portion.

Another embodiment of the present invention provides a biodegradable system, which comprises a first biodegradable film portion and a biodegradable structural portion wherein the first biodegradable film portion is easily separated from the biodegradable structural portion for disposal of the system. In certain embodiments, the system further comprises a cover layer of second biodegradable film portion which adheres to the first biodegradable film portion to form a sealed compartment for food or drink reservation.

DETAILED DESCRIPTION

In order to fully understand the manner in which the above-recited details and other advantages and objects according to the invention are obtained, a more detailed description of the invention will be rendered by reference to specific embodiments thereof. Other features and advantages of the present invention will become apparent from the following detailed description. It should be understood, however, that the detailed description and the specific examples, while indicating the preferred embodiments of the present invention, are given by way of illustration only, since various changes and modifications within the spirit and scope of the present invention will become apparent to those skilled in the art from this detailed description.

One embodiment relates to a partly-biodegradable system comprising a biodegradable portion and a non-biodegradable portion. The biodegradable portion is a biodegradable material processed into a desired shape, such as a food service item or other container including cups, trays, plates, clamshells, and bowls. The non-biodegradable portion is a non-biodegradable film adhering to the surface of the biodegradable portion, wherein the non-biodegradable and the biodegradable portions can be easily separated for separate disposal of the two portions.

Figure 1:
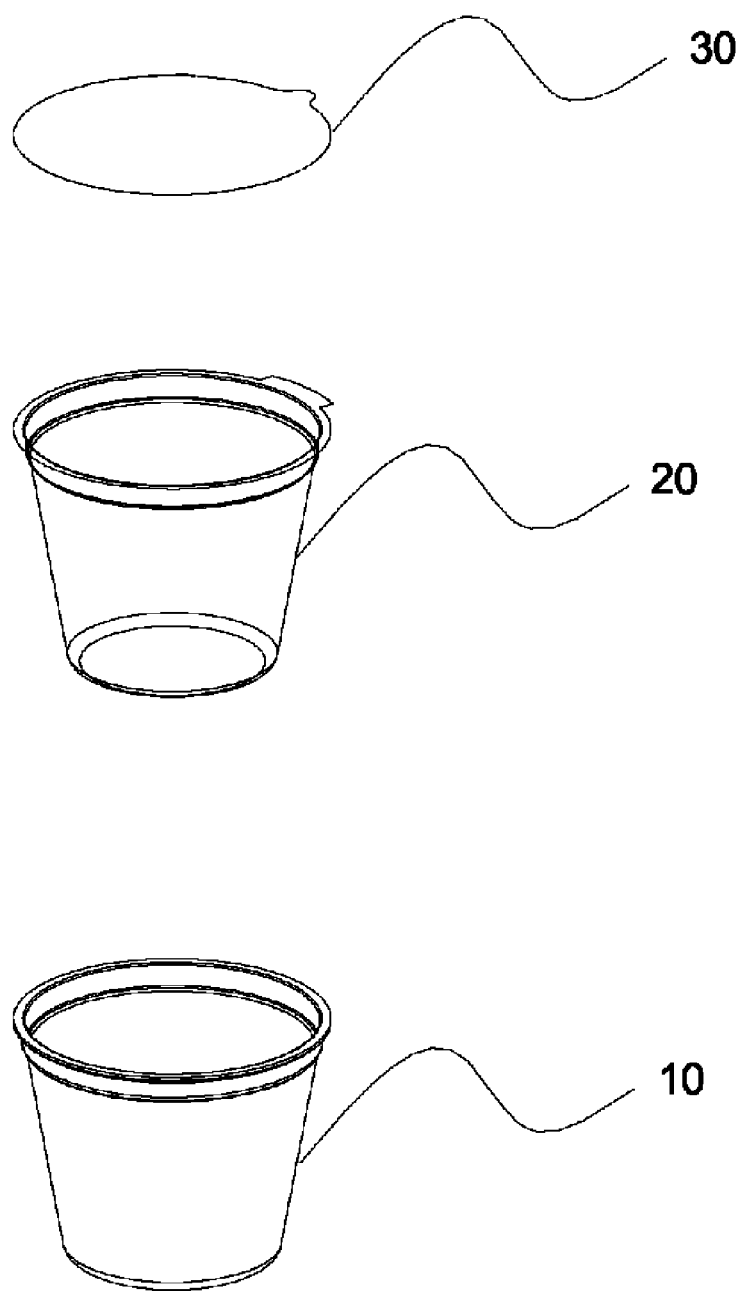
FIG. 1 shows an exploded view of a cup according to one embodiment comprising a biodegradable cup portion, a non-biodegradable inner laminate film to line the inner surface of the biodegradable cup portion, and a cover film.
Figure 2:
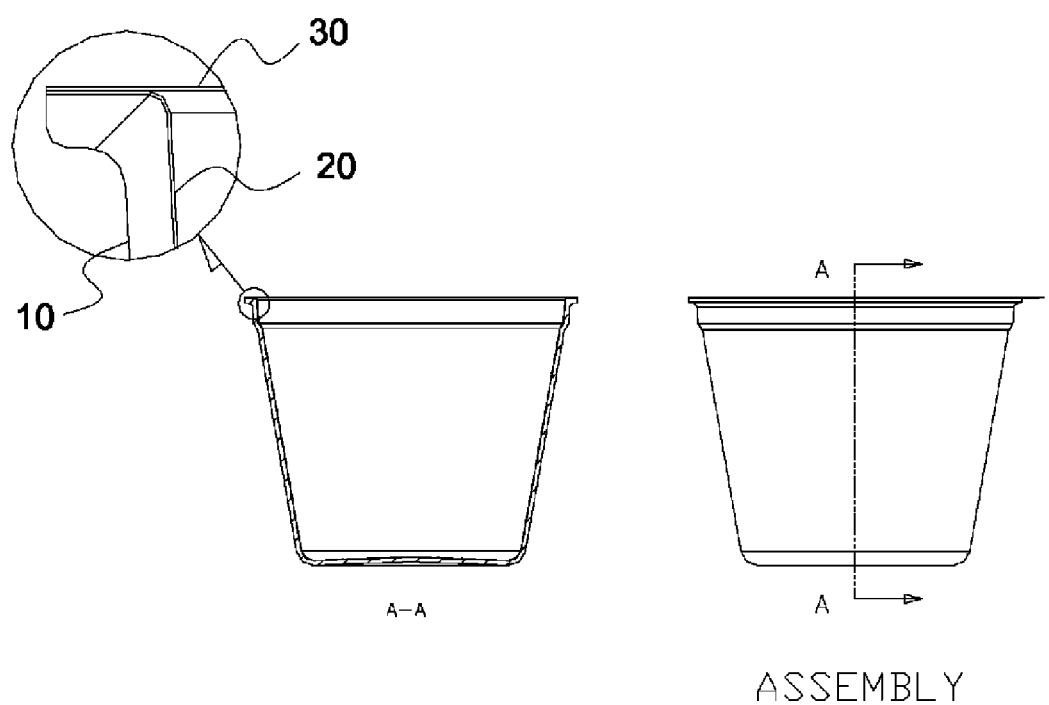
FIG. 2 shows a cross section of the cup of FIG. 1 through the line AA with a portion of the cross section enlarged.

Referring to FIG. 1, the partly-biodegradable system comprises a biodegradable cup portion 10, also referred to herein as a substrate or first portion, a non-biodegradable inner film 20, also referred to herein as liner or a second portion, to line the inner surface of the biodegradable cup portion, and a cover film layer 30, also referred to herein as a cover or third portion. The cover film layer adheres to the top of the non-biodegradable inner film, the biodegradable cup portion, or both, and forms a sealed compartment with the non-biodegradable inner film. The compartment can be used to protect and increase the longevity of food, drink, or other substances placed in it. In certain embodiments, the inner film and the cover film are of the same materials or of different materials and the cover film can be easily peeled from the inner film. In some embodiments, the non-biodegradable inner film may have stronger adhesion to the biodegradable cup portion than the cover film has to the non-biodegradable inner film such that the two film portions may be easily separated. In other embodiments, other means may be used such the cover film and the inner film can be easily separated, e.g., tabs. The non-biodegradable portions may be formed from recyclable materials.

In certain embodiments, the biodegradable material is a starch-based substrate forming a starch-based matrix. Examples of substrates suitable for use with embodiments of the present invention are disclosed in U.S. patent application Ser. No. 10/928,602, filed Aug. 26, 2004, U.S. patent application Ser. No. 11/285,508, filed Nov. 21, 2005, U.S. patent application Ser. No. 12/168,049, filed Jul. 3, 2008, and U.S. patent application Ser. No. 12/257,289, filed Oct. 23, 2008, which, by reference, are incorporated herein in their entirety.

In certain embodiments, the non-biodegradable inner film and cover film have desired properties under certain conditions. The desired properties include, for example, moisture barrier or resistance, oxygen barrier or resistance, and other atmosphere barriers or resistance. The conditions include, for example, low temperature (e.g., chilled or frozen), room temperature and high temperature (e.g., microwavable or ovenable). The inner and cover films can comprise one or more of the following polymers: polyethylene (PE), polyethylene/vinyl acetate (EVA), amorphous polyethylene terephthalate (APET), polyamide-6 (PA-6 or nylon 6), Surlyn (zinc and sodium ionomers) and polyester films or any film disclosed herein. In certain embodiments, the non-degradable films are various types of multilayered films manufactured by Sealed Air Corp., for example, the T series forming webs (e.g., T0xxB, wherein xx is 10-90; T11xxBA, wherein xx is 40 and 80; and T70xxBZ, wherein xx is 10-90), the vacuum skin packaging (VSP) films (e.g. V170BZ) and the VSP series composites. Further, the film may be monolayer, or may comprise at least 2, 3, or 4 layers, or may comprise at most 7, 8, or 9 layers.

In other embodiments the material processed into a desired shape can be biodegradable, partly or substantially biodegradable, or nonbiodegradable, and the film layer or layers can be biodegradable, partly or substantially biodegradable, or nonbiodegradable, or any combination of the foregoing. For any above combination, a user is able to separate the layers for, e.g., separate disposal.

In certain embodiments, the system is used as a food container, wherein food can be a liquid food (e.g., drinks, soup) or solid food with less aqueous content.

In other embodiments, the system is a soup or drink container comprising a biodegradable container; an inner film on the inner surface of the container, whereby the soup or drink is placed in the liquid form into the container; and a cover film which seals the soup or drink into a sealed compartment by adhering to the inner laminate film, the biodegradable container, or both, on the top edge of the container.

The bond or peel strength of the peelable seal preferably is sufficiently high to withstand the expected use conditions without premature failing, yet the bond strength is sufficiently low to achieve an easy open characteristic. The term "peel strength" used in referring to the peel strength of a peelable seal is the amount of force required to separate the peelable layer from the substrate, for example, an inner laminate film from an inner surface of a biodegradable cup portion, or a cover layer from the inner laminate film. The term "peelably sealed" is used to describe the strength of a peelable seal between peelable film and a substrate such that the peel or bond strength of the peelable seal formed between the peelable layer and the substrate surface layer facilitates an easy open characteristic, for example, the bond strength within the range of from about 0.5 pounds per inch width (lb/in) to about 4.5 lb/in in order. The term "easily" as used in "easily separated" and "easily peeled off" or similar means that the bio-degradable and non-biodegradable materials, and/or film(s) and structure, may be substantially separated by hand peeling by an end consumer. For example, this would include, but is not limited to, using bond or peel strengths of about 0.5 to about 4.5 lbs/inch. Other useful peelably sealed peel strengths include from about 1 to about 4.5 lb/in, from about 1.5 to about 4.5 lb/in, from about 2 to about 4.5 lb/in, from about 0.5 to about 4 lb/in, from about 0.5 to about 3 lb/in, from about 0.5 to about 2.5 lb/in, from about 0.5 to about 2 lb/in, from about 1 to about 3 lb/in, from about 0.7 to about 2 lb/in, and from about 1 to about 2.5 lb/in.

Peel force can readily be determined using Instron test equipment and applying a standard test method such as ASTM D903 or ASTM F88, both incorporated by reference. Using this type of equipment it was determined that the Sealed Air Corp. T series film T7235B sealed at 135° C. to the Biosphere tray material designated PPM-100 gave a peel force of 1.5-1.9 lbs/inch, which would be described as an easy peel. Without being bound by any particular theory, it is believed that the easy peel force between a laminate layer and the starch-based matrix of PPM-100 is a result of cohesive bond failure within the dense skin of the starch matrix of the PPM-100 material.

Another aspect of the present invention relates to a method to create the partly-biodegradable system whereby the non-biodegradable portion is easily separated from the biodegradable portion.

Another aspect of the present invention relates to a method to create the partly-biodegradable system whereby the non-biodegradable cover layer is easily separated from the non-biodegradable layer on the surface of the biodegradable container. In some embodiments, the peel failure occurs in the starch-based matrix, or at or near the surface of the starch-based matrix.

In certain embodiments, the method comprises processing a biodegradable material into a container with a desired shape and applying a non-biodegradable inner film layer on the surface of the biodegradable container. In certain embodiments, the method further comprises putting food, drink or other desired subject in the biodegradable container having an inner film and applying a cover layer of non-biodegradable material on top of the food to protect and increase the longevity of the enclosed food, drink or subject. As set forth above, the cover film may attached to the inner film, the biodegradable material of the container, or both.

In certain embodiments, the non-biodegradable material is processed first to the form of a film and then directly adhered to the surface of the biodegradable container. In certain embodiments, the non-biodegradable layer is thermoformed on the surface of the biodegradable container. In other embodiments the film is heated to a temperature such that the film will adhere to the starch matrix, but will retain its structural integrity for easy separation. Typically, this cannot be accomplished if the film is heated to a temperature that substantially melts the film. For example, for preferred temperatures the film retains its integrity, adheres to the tray, and can be peeled from the tray. In other embodiments a roller or plate can be used to ensure proper adhesion if necessary while maintaining a temperature such that the film will retain its structural integrity. In another embodiment the film can indirectly adhered to the surface of the biodegradable container, by, for example, an adhesive or other intermediate.

In another embodiment, a method is provided for disposal of a partly-biodegradable material as disclosed herein. Said method comprising providing a partly biodegradable article having a biodegradable portion and a one or more non-biodegradable film portions, substantially separating the biodegradable portion from the one or more non-biodegradable film portions by peeling the one or more non-biodegradable film portions from the biodegradable portion, and separately disposing the biodegradable portion and the one or more non-biodegradable film portions.

In certain embodiments, the two non-biodegradable films are made of the same or different materials. The desired properties of the non-biodegradable films include, for example, moisture, oxygen resistance and other atmosphere properties under different conditions, e.g. low temperature, room temperature, high temperature and in microwave.

EXAMPLES

In a first example, the non-biodegradable multilayered film manufactured by Sealed Air Corp. designated CN 2025 was vacuum thermoformed to a tray to provide an suitable oxygen barrier for use at temperatures up to about 121° C. This film is a 2.5 mil cook-in film with one face metallocene LLDPE and one face PA-6. Samples were prepared having both the LLDPE face and PA-6 face adjacent the tray. The tray comprised the material designated PPM100 from Biosphere Corp, which is a starch based material. Unexpectedly, the film adhered well to the tray for use in applications that require moisture and/or oxygen barrier, but was readily peelable from the tray following use to allow for separate disposal of the biodegradable and non-biodegradable components.

In a second example, a 50 micron APET non-biodegradable film was vacuum thermoformed to a tray comprising the material designated PPM100 from Biosphere Corp. Again, unexpectedly, the film adhered well to the tray but was readily peelable from the tray to provide the required moisture and oxygen barriers for certain food applications but allow for separate disposal of the biodegradable and non-biodegradable components.

In a third example, a non-biodegradable multilayered oxygen barrier film was vacuum thermoformed to a tray comprising the material designated PPM100 from Biosphere Corp. The film is a 4.0 mil vacuum skin film with one face Surlyn (zinc ionomer) and the other face HDPE. Samples were prepared having the Surlyn face adjacent the tray. Again the film adhered well to the tray and was readily peelable from the tray to provide the required moisture and oxygen barrier for certain food applications but allowed for separate disposal of the biodegradable and non-biodegradable components.

In a fourth example, a non-biodegradable multilayered oxygen barrier film manufactured by Sealed Air Corp., designated VS634HB, was vacuum thermoformed to a tray comprising the material designated PPM100 from Biosphere Corp. VS634HB is a 6.0 mil vacuum skin film with one face EVA and the other face HDPE. Samples were prepared having the EVA face adjacent the tray. Again the film adhered well to the tray but was readily peelable from the tray following use to allow for separate disposal of the biodegradable and non-biodegradable components.

In a fifth example, a non-biodegradable multilayered oxygen barrier film manufactured by Sealed Air Corp., designated VS834HB, was vacuum thermoformed over a simulated meat product that was placed on the VS634HB laminated PPM100 tray prepared in the fourth example. VS834HB was a 4.0 mil vacuum skin film with one face metallocene LLDPE and the other face HDPE. Samples were prepared having the LLDPE face adjacent the tray. The cover VS834HB film adhered well to the VS634HB film, which had been laminated to the tray in the fourth example to provide the required moisture and oxygen barrier for certain food applications, but was readily peelable from the VS634HB film.

The cover VS834HB film could be removed from the VS634HB film to open the package and remove the product, without peeling the VS634HB film from the tray. Once the simulated meat product was removed, both the cover VS834HB and tray laminated VS634HB non-biodegradable films could be removed from the tray thus allowing for separate disposal of the biodegradable and non-biodegradable components.

Through the above examples it was found that EVA, Surlyn, LDPE, APET and PA-6 adhered well to the tray, wherein EVA and Surlyn adhered better than LDPE, which adhered better than APET, which adhered better than PA-6.

Although the invention has been described with respect to specific embodiments and examples, it will be readily appreciated by those skilled in the art that modifications and adaptations of the invention are possible without deviation from the spirit and scope of the invention. Accordingly, the scope of the present invention is limited only by the following claims.

What is claimed is:

1. A container comprising:
   a first portion having a substantially biodegradable starch matrix; and
   a second portion comprising a non-biodegradable film adhering to the inner surface of the first portion,
   wherein the bond strength between the first portion and the second portion is from about 0.5 pounds per inch width to about 4.5 pounds per inch width.

2. The container of claim 1 further comprising a third portion comprising a non-biodegradable film adhering to the second portion to form a cavity between the second portion and the third portion, wherein the third portion can be easily separated from the second portion prior to separation of the second portion from the first portion.

3. The container of claim 1 wherein the first portion comprises:
   water;
   starch; and
   fibers.

4. The container of claim 1 wherein the second portion provides moisture resistance or oxygen barrier properties suitable for food packaging applications.

5. The container of claim 1 where the first portion and the second portion are directly adhered together.

6. The container of claim 1 where the first portion and the second portion are indirectly adhered together.

7. The container of claim 1 further comprising a third portion including a non-biodegradable film, wherein the third portion adheres to at least a part of the second portion.

8. A container comprising:
   a substrate comprising starch-based matrix; and
   a liner comprising one or more polymers,
   wherein the liner is adhered to the substrate and the bond strength between the substrate and the liner is from about 0.5 pounds per inch width to about 4.5 pounds per inch width.

9. The container of claim 8 wherein the bond strength between the substrate and the liner is from about 1 pounds per inch width to about 4.5 pounds per inch width.

10. The container of claim 8 wherein the liner is peelable from the substrate without cohesive failure within the liner.

11. The container of claim 8 wherein the liner is directly adhered to the substrate.

12. The container of claim 8 wherein the liner is indirectly adhered to the substrate.

13. The container of claim 8 further comprising a cover, wherein at least a portion of the cover is adhered to the liner.

14. The container of claim 8 wherein the bond strength between the substrate and the liner is from about 2 pounds per inch width to about 4.5 pounds per inch width.

15. The container of claim 8 wherein the bond strength between the substrate and the liner is from about 0.5 pounds per inch width to about 3 pounds per inch width.

16. The container of claim 8 wherein the bond strength between the substrate and the liner is from about 0.5 pounds per inch width to about 2 pounds per inch width.

17. The container of claim 8 wherein the bond strength between the substrate and the liner is from about 1 pounds per inch width to about 2.5 pounds per inch width.

18. A container comprising:
a substrate comprising starch-based matrix; and
a liner comprising one or more polymers, wherein the one or more polymers are selected from the group consisting of polyethylene, polyethylene/vinyl acetate, amorphous polyethylene terephthalate, polyamide-6, Surlyn and polyester,
wherein the bond strength between the substrate and the liner is from about 0.5 pounds per inch width to about 4.5 pounds per inch width.

19. The container of claim 18 wherein the liner comprises a multilayer film.

20. The container of claim 18 wherein the bond strength between the substrate and the liner is from about 1 pounds per inch width to about 3 pounds per inch width.

* * * * *